June 18, 1929.  L. H. NICHOLSON  1,717,806
TIRE RIM TOOL
Filed July 18, 1927
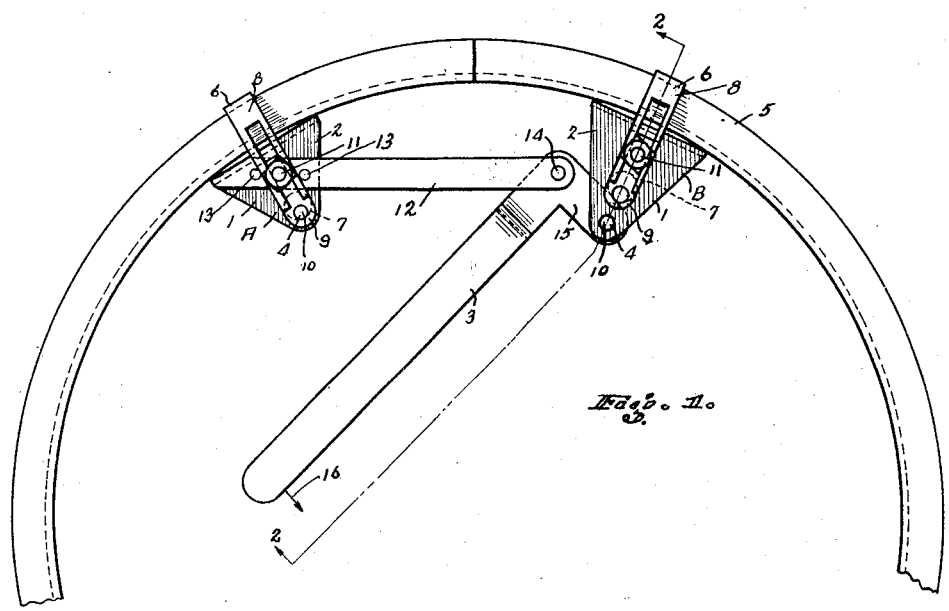
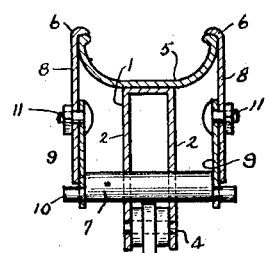
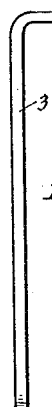
INVENTOR
LISLE H. NICHOLSON.
BY Munn & Co.
ATTORNEYS.

Patented June 18, 1929.

1,717,806

UNITED STATES PATENT OFFICE.

LISLE H. NICHOLSON, OF CENTRALIA, WASHINGTON.

TIRE-RIM TOOL.

Application filed July 18, 1927. Serial No. 206,663.

My invention relates to improvements in tire rim tools, and it consists in the combinations, constructions and arrangements hereinafter described and claimed.

An object of my invention is to provide a tire rim tool which can be quickly connected to a rim, and which when actuated for collapsing the rim will first spread the ends of the rim apart for permitting the ends to overlap each other during the remainder of the operation.

A further object of my invention is to provide a device of the type described which is extremely simple in construction and which is durable and efficient for the purpose intended.

Other objects and advantages will appear in the following specification, and the novel features of my invention will be particularly pointed out in the appended claim.

My invention is illustrated in the accompanying drawing forming a part of this application, in which Figure 1 is a side elevation of the device shown operatively applied to a rim, and Figure 2 is a section along the line 2—2 of Figure 1.

In carrying out my invention I provide two rim clamping members A and B, which are identical in construction, and therefore a description of one will suffice for both.

The clamping member B has a U-shaped member 1, see Figure 2, which has sides 2 that are triangular in shape, see Figure 1. The apexes of the triangular-shaped sides 2 carry a lever 3, which is pivoted at 4. The base of the U-shaped member 1 bears against a rim 5 and is held in position by hooks 6.

The hooks are adjustably secured to the member 1 by a shaft 7, and each hook comprises two pieces 8 and 9. The piece 9 is pivotally secured to a trunnion 10 eccentrically mounted upon the shaft 7 and is adjustably secured to the piece 8 by means of the bolt 11.

The main body portion of the shaft 7 is journalled in the member 1, and when this portion is rotated through an arc of 180 degrees, it will move the member 1 with respect to the hooks 6 for releasing or securing the hooks to the rim.

The clamping members A and B are connected to each other by a link 12, which is rigidly secured to the member A by rivets 13, or other suitable fastening means, and is pivotally secured to the lever 3 at 14.

From the foregoing description of the various parts of the device, the operation thereof may readily be understood.

In attaching the device to the rim 5, the hooks 6 are adjusted by means of the bolts 11 so that they will grip the rim and bring the member 1 into contact with the rim when the shaft 7 is rotated through an arc of 180 degrees, into the position shown in Figure 2. The initial movement of the lever 3 will cause the ends of the rim to spread slightly, due to the fact that the portion 15 of the lever is swung into alignment with the link 12. Continued movement of the lever in the direction of the arrow 16, see Figure 1, passes one end of the rim inside of the other and longitudinally therealong. The lever is held in its extreme position by the spring of the rim, the lever having swung through approximately an arc of 200 degrees during its movement.

Reverse operation of the lever 3 closes the rim and brings the two ends together into their normal position. The clamps A and B are then quickly released from the rim by turning the shafts 7 through arcs of 180 degrees. The device is very efficient for the purpose intended, and provides a simple construction which will expand the ends of the rim slightly during the opening and closing movements of the device.

Although I have shown and described one embodiment of my invention, it is to be understood that the same is susceptible of various changes and I reserve the right to employ such changes as may come within the scope of the appended claim.

I claim:

A tire rim tool comprising two rim-engaging members, each member including a pair of adjustable hooks for engaging with the opposite edges of a rim, a certain portion for contacting with the bottom of the rim, a cam for adjustably connecting the hooks and central portion together, and a bell crank lever carried by one member and an arm rigidly connected to the other member and being pivotally connected to the lever, said cams causing said members to grip the rim when said lever is actuated.

LISLE H. NICHOLSON.